Nov. 15, 1938.    M. FRANKL    2,136,430
PROCESS FOR THE SMELTING AND REDUCTION OF MINERALS
Filed March 27, 1936
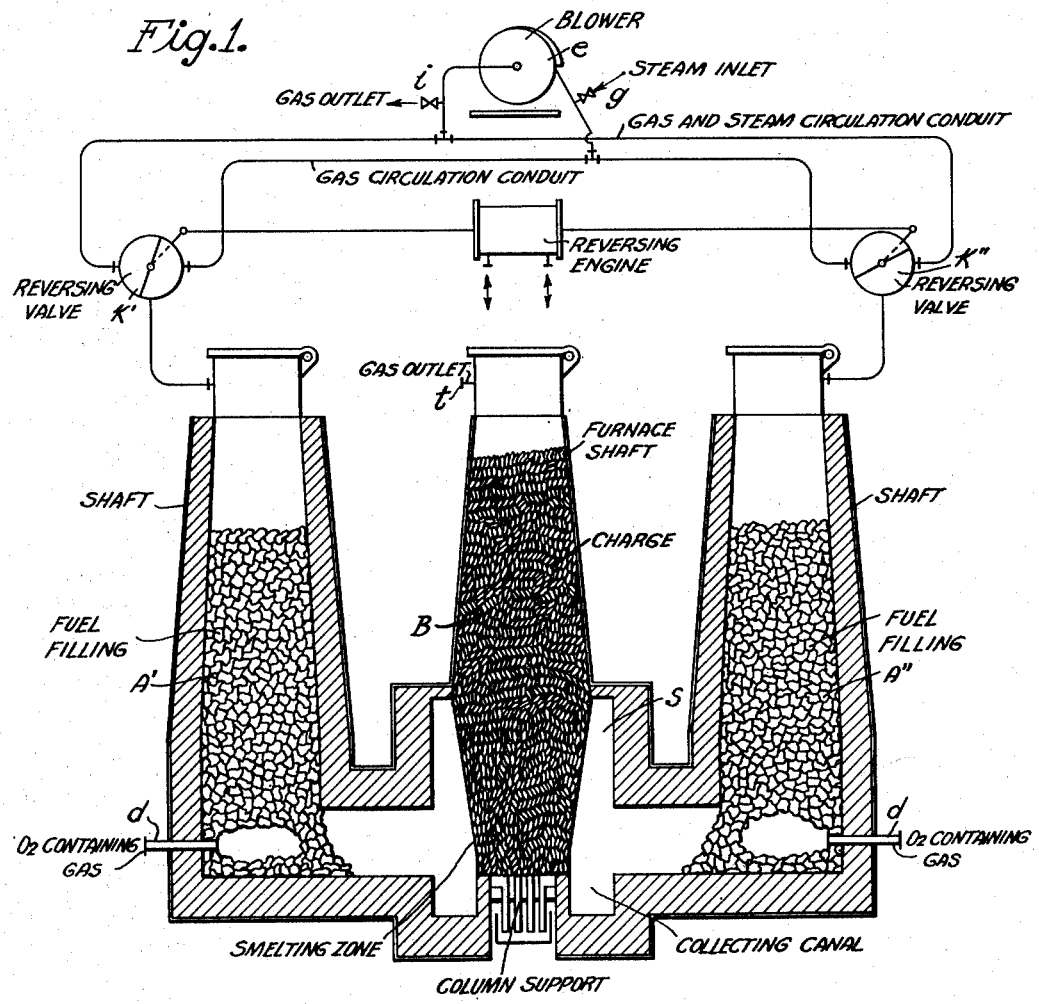
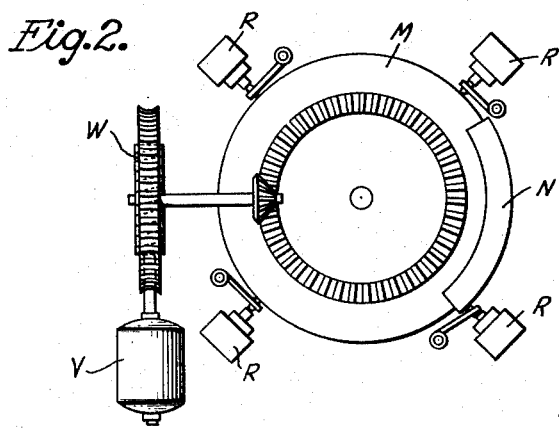
INVENTOR
MATHIAS FRÄNKL
BY
Watson, Bristol, Johnson & Leavenworth
ATTORNEYS Patented Nov. 15, 1938

2,136,430

UNITED STATES PATENT OFFICE 2,136,430

PROCESS FOR THE SMELTING AND REDUCTION OF MINERALS

Mathias Frankl, Augsburg, Germany, assignor to American Oxythermic Corporation, New York, N. Y., a corporation of Delaware Application March 27, 1936, Serial No. 71,119
In Germany August 26, 1931

11 Claims. (Cl. 23—208)

The invention relates to a process for the smelting and reduction of reducible oxides, more particularly to a process for the production of metallic carbides and includes correlated improvements and discoveries whereby the production of such compounds is enhanced.

This application is related to and is in the nature of an improvement upon the process described in my copending application, Serial No. 568,710 filed October 14, 1931. The process set forth in my copending application is described particularly in connection with the production of calcium and silicon carbides by reduction of lime and silica with carbon in a suitable furnace.

The production of the carbides of calcium and silicon by reduction takes place only at a temperature of over 2000° C. The heating gas must therefore contain a considerable quantity of sensible heat. The heat remaining in the outgoing gases which are at a temperature lower than 2000° C. is largely lost, inasmuch as it cannot be wholly utilized for preheating the raw materials and coke or carbon to the reduction temperature. The total heat production during the process is 7500 cal. The production of one kilogram of calcium carbide requires an expenditure of about 3000 cal. The outgoing gas would contain, therefore, about 4500 cal. and since only about 1500 cal. are required for preheating the raw material and the coal to the temperature of reduction, there would be a loss of about 3000 cal. of sensible heat in the waste gas. It is an object of this invention to provide a process for the smelting and reduction of reducible oxides in which the sensible heat of the waste gases is largely utilized.

It is a further object of the invention to provide a process for the production of carbides of calcium and silicon in which the outgoing waste gases have the heat content thereof largely recovered in the form of combustible gas.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

For a fuller understanding of the nature and objects of the invention reference should be had to the following detailed description taken in connection with the accompanying drawing, in which Figure 1 illustrates diagrammatically an apparatus in which the process of the invention may be practiced.

In the practice of the invention steam may be alternately conducted into the regenerators or fuel shafts A' and A". The introduction is at the top of the shafts and the steam so introduced is decomposed upon contacting with highly heated coal or coke contained in the shafts with the formation of hydrogen and oxygen. The oxygen produced then reacts with the fuel content causing gasification thereof and formation of carbon monoxide. The dissociation or decomposition of steam by highly heated fuel takes place in accordance with the usual water gas reaction in which the water is first dissociated, forming hydrogen and oxygen with immediate reaction of the oxygen with carbon to form carbon monoxide. The heat required for heating and decomposing the steam is furnished by the heat content of the waste gas, in that such gas upon passing from the reducing and smelting zone, S, is conducted alternately through the fuel shafts A' and A". Simultaneously with the introduction of steam into the highly heated fuel an oxygen containing gas is admitted through the respective nozzle $d$ thereby burning a part of the fuel and producing a combustion gas which admixes with the gas arising from interaction of the steam and fuel, thus giving a highly heated gas mixture that passes to the smelting zone wherein it flows around and contacts with the materials undergoing processing. The gases when leaving the smelting zone have a temperature of about 2000° C. and give up heat to the coal or coke in the shaft from which it is in turn taken up by the steam when it undergoes decomposition. In accordance with this procedure the heat content of the waste gas coming from the smelting zone may be converted into a combustible gas and the temperature of such waste gas when leaving at the top of the fuel shaft may be about 100° to 300° C. It is apparent, therefore, that only a small amount of the sensible heat is lost.

The smelting zone comprises the lower part of the furnace into which the material being treated passes as a coherent mass from the upper part or shaft B of the furnace. The coherence of the mass, whereby a column structure is maintained through the smelting zone, is effected by withdrawing a minor part of the heating gases upward through the shaft, thereby preheating the descending materials. The reduction or smelting of the mineral substances takes place in the smelting zone S. The heating of the charge is effected by a mixture of combustion gases and a combustible gas produced by introducing steam into a regenerator wherein it contacts with highly heated fuel, and by combusting a part of the fuel by an oxygen containing gas. The high temperature required for the smelting is produced by the combustion of fuel in the lower part of the regenerators to carbon monoxide and hydrogen whereby heat is obtained in sensible form. A small part of the fuel in the regenerators is burned or consumed by the oxygen set free by the decomposition of steam introduced at the top of the regenerators whereby further sensible heat is evolved and utilized to furnish a part of the heat necessary to effect a decomposition of the same. It, of course, will be realized that the oxygen containing gas introduced to burn a part of the fuel may bring about combustion of a small part of the combustible gases formed. As the charged material is reduced, for example, with the formation of calcium carbide, the reduced compound melts and flows away from the charge into a receiving channel from which it may be tapped as desired. The gaseous mixture, after contacting with the charged material in the smelting zone, passes out through a second regenerator charged with fuel with which the heated gases contact and give up their sensible heat in large measure, whereafter the heat stored is utilized to assist in the decomposition of introduced steam. The flow of gases through the smelting zone and through the regenerators is alternately and periodically reversed, and the fuel within the shafts or regenerators replenished as required, as are also the substances to be processed in the furnace shaft B.

As an illustrative example of the manner in which the invention may be practiced, the following is presented:

The raw materials for the production of a metallic carbide, as lime or silica, in admixture with a quantity of coal or coke necessary to effect reduction of the lime or silica with formation of the carbide, are first briquetted and then charged in this form into the furnace shaft, B. The shafts A' and A'' are charged with a fuel material, as coal or coke. It is to be understood that the term "fuel" as used throughout the specification and in the claims refers to coal or coke. Oxygen containing gas is introduced through the nozzle, d, whereupon it causes combustion of a part of the fuel and consequent production of combustion gases having a high temperature. Steam is simultaneously introduced into the system at g and flows alternately through the fuel shafts A' and A''. This flow of gaseous mixture through the fuel shafts and the reducing zone is alternated or reversed at short intervals, e. g., three to five minutes. The steam passes through the highly heated coal or coke; is thereby first heated to from 800° C. to 1000° C., and then undergoes decomposition and reaction with carbon to form carbon monoxide and hydrogen. This mixture of gases passes through the smelting chamber, S, and around the charged material undergoing treatment, and thence out through the other fuel shaft, wherein it gives up its sensible heat to the fuel, i. e., the fuel filling in the shafts or regenerators A' and A'' is preheated thereby. The temperature decreases from the bottom of the shaft to the top and the gas is finally withdrawn at a temperature of about 100° to 300° C. at t, together with the gas produced from the combustion of a portion of the fuel by means of the introduced oxygen containing gas. Reversing valves, k' and k'', effect the alternate leading of the steam into one or the other of the two fuel shafts. The reversing valves are actuated by means of the reversing engine, shown in the drawing as positioned above the shaft B, which is operated by compressed air introduced thereinto by an electrical or mechanical device (Figure 2), which comprises a rotating disk M, carrying a cam N, and four compressed air valves R, two of which serve as inlet and two as outlet valves. The rotating disk may be driven by a worm gear W, to which power is supplied by an electric motor V. The drive is such that the disk makes half a rotation in about three to five minutes, whereby the cam alternately opens the compressed air inlet valves and thus causes inflow of compressed air through the reversing engine, either below or above the piston. The outlet air valves are, in the meantime, alternately opened by the cam at every half rotation so that at the other side of the piston of the reversing engine the compressed air is allowed to escape before the air enters on the opposite side. The valves are closed automatically by means of springs.

A blower, e, serves to bring about an artificial cycle of heating gas in order to improve the transfer of heat in the smelting and reducing chamber, S. The blower e functions, for example, by withdrawing waste gases from the shaft A'' through the reversing valve k'' and thence by conduit i to the intake and forces out through the outlet and conduit g to the reversing valve k' and thence to the top of the shaft A'. Upon reversal of the valves k' and k'' the gas is withdrawn from the shaft A' through valve k' and conduit i to the intake and passes from the blower through conduit g, through valve k'' and thence to the top of the shaft A''. Steam may be introduced through the valve connecting with the conduit g and, if desired, gas may be withdrawn through the valve connected with the conduit i.

A part of the gas passing to the smelting zone is conducted upwardly through the raw material that has been charged into the furnace shaft B for the purpose of heating such raw material to the smelting temperature. The gas so utilized is conducted therefrom at t.

The sintering together of the charge whereby a column formation is set up and maintained may be initially effected by filling the lower part of the furnace, that is, the smelting space, with coke. The coke is charged so that the entire height of the smelting space is occupied, i. e., the coke filling is continued to the bottom of the shaft. The charge of oxide and reducing agent in briquetted form is then filled into the shaft and supported by the coke. Air, or air enriched in oxygen, heated to a temperature of about 500° C., may be introduced through the nozzles d whereby the coke in the respective regenerator is ignited and burned. The hot combustion gases in conjunction with the circulating gaseous mixture, heated to a high temperature by contact with the fuel filling in the regenerator, is passed to the smelting space, and the coke filling and the charge in the shaft are heated by the hot gases. These gases raise the temperature of the coke, and of the material in the shaft to a point at which melting takes place. The melted material flows down through the heated coke, and absorbs carbon therefrom. Thereby the coke is gradually consumed and the charge in the shaft gradually descends until the base of the smelting space is reached, and thereafter the reduction or smelting process proceeds in the normal working manner. As the coke gradually recedes, the material in the shaft passing into the smelting space is sintered together, thus forming a supporting column of the type shown in the drawing, of which the outer surface and the base melts and passes to the bottom of the smelting chamber. The consumption of the coke initially charged as a supporting means usually requires about 10 to 12 hours, after which the process proceeds in the manner shown and described. In the continued operation of the process the fuel filling of the regenerator that is burned is replenished by introduction at the top.

The carrying out of the foregoing operation in which metallic carbides are formed with the simultaneous production of a combustible gas, effects a saving in heat content. It provides for a utilization of heat, which would otherwise be lost, by including a process for the manufacture of a combustible gas, and effects through this combination such a saving as to give a process which is more than 80 percent thermally efficient.

There is not a fairly uniform temperature existing in the fuel filled shafts or regenerators from the top to the bottom. In contradistinction thereto the temperature at the top of these shafts is relatively low, perhaps about 100° C., whereas the temperature at the base, due to contact of the generated combustible gas with the highly heated fuel in the lower part of the shaft and admixture therewith of a combustion gas having a high temperature, is in the neighborhood of 2,000° C. In other words, at that temperature which is necessary to effect a reduction of reducible oxides, as lime and silica, with the formation of corresponding carbides.

As the reversing valves $k'$ and $k''$ are set, the circulating gas is being withdrawn from the shaft or regenerator A'' through the valve $k''$ and into the blower $e$ through the conduit $i$. The gaseous mixture leaves the blower through the conduit $g$ and thereby is conducted to the reversing valve $k'$, and thence lead into the top of the shaft or regenerator A'. The fuel filling in the regenerator A' has, during the previous cycle, been highly heated by means of the hot gases passing from the reducing zone to the top of the regenerator. In other words, the heat from these hot gases is stored in the fuel. This will give a temperature gradient in the shaft from the bottom to the top of about 2,000° C. to 100° C. Consequently, at about the middle portion of this shaft there will be a temperature of about 1,000° C., or that temperature which is necessary to carry out a decomposition of steam by carbon, i. e., water gas reaction. Therefore, the circulating gas coming from the blower $e$ and having had a small amount of steam introduced thereinto through the valve connection leading to the conduit $g$ passes downwardly through the highly heated fuel filling in the shaft and taking up heat therefrom becomes gradually heated at about the middle portion of the shaft to that temperature at which the water gas reaction takes place. In this region decomposition of steam by the carbon and reaction of the oxygen set free with the carbon forms water gas, i. e., a mixture of hydrogen and carbon monoxide.

This combustible gas along with the rest of the gaseous mixture flows downwardly through the highly heated fuel, and becomes in turn highly heated by taking up heat therefrom. The temperature at the bottom of the column would, accordingly, be in the neighborhood of 2,000° C., but in order to assure that such temperature is reached, a part of the fuel filling is burned at the base of the regenerator by means of air enriched in oxygen introduced at this point. The hot combustion gases arising from the burning of the fuel mix with the highly heated gases flowing down through the regenerator and form a heating gaseous mixture having a temperature of about 2,000° C. which passes into the reducing zone and there effects the desired reduction or formation of the carbide. The greater part of the hot gases then passes from the heating zone out through the regenerator A'' and therein give up their heat to the fuel filling wherein the heat is stored or, expressed somewhat differently, the fuel filling preheated.

After a period of three to five minutes the flow of gas is reversed so that the regenerator A'', which previously functioned as a heat storing zone, now becomes a heat yielding or gas generating zone, and the other generator A' becomes the heat storing zone.

It may be added that the regenerators are not acting entirely as gas generators, but only to such an extent as to take up the sensible heat of the waste gases or, expressed somewhat differently, so that the outgoing waste gases may have their heat content largely recovered in the form of a combustible gas. Consequently, the temperatures set forth are easily maintained. For instance, if calcium carbide is being produced, there must be about 1800 calories per kg. of carbide expended for the reduction of the calcium oxide to calcium carbide at a temperature of 2,000° C. Since the heat of combustion of carbon is contained in the combustion gases only in the form of sensible heat, the heat content of these gases below 2,000° C., would, in a great measure, be lost in so far as it can not be utilized for preheating the components entering into the formation of carbide, because this requires only about half of the quantity available. Consequently, from 900 to 1,000 calories per kg. of burned carbon would be carried off from the regenerators in the form of sensible heat.

To overcome this, it is proposed to introduce steam alternately into the top of the regenerators so that the surplus of heat is used up through decomposition of the steam, with succeeding burning of a part of the carbon by the oxygen released. This decomposition of steam takes place in the upper half of the regenerator, inasmuch as only that amount is introduced as is required to take up the surplus of sensible heat from the waste gases. Alternately, the waste gases give up their surplus of sensible heat to the fuel filling in the regenerators. It is then used again through a heating of the steam to 1,000° C., and subsequent raising of the temperature of the water gas to substantially 2,000° C. by contacting with highly heated fuel in the lower part of the regenerator. The temperature is finally raised to 2,000° C. by the combustion of carbon by means of air enriched in oxygen, or oxygen poor in nitrogen.

The hot circulating gases then pass through the combustion zone whereby heat necessary to carry out the reaction and melt the product is acquired, and thence they pass to the other shaft in which sensible heat is largely stored. A temperature of 2,000° C. accordingly is readily attained in the lower part of the regenerators by the combined combustion and heat taken up from that stored in the fuel filling, and particularly so since the amount of steam decomposed is that which corresponds only to the surplus of sensible heat in the waste gases. This may be illustrated by the following: 2 cbm. meters of carbon monoxide releasing 2450 cal. result from the combustion of 1 kg. of carbon with 1 cbm. of oxygen at the lower end of the regenerator. Each of these 2 cbm. of combustion gases, therefore, contains 1225 calories, which corresponds to a temperature of about 4,000° C., since there is no dissociation taking place through the combustion of carbon to CO, as would be the case if $CO_2$ were being produced. The temperature of 2,000° C. is obtained by admixing a cubic meter of gas with each cubic meter of combustion gas. This will give the ratio of $$\frac{4,000}{1+1} = 2,000° C.$$

The decomposition of the small amount of steam in the upper part of the regenerators is without influence on the maximum temperature that can be obtained at the lower end and, if desired, a temperature of 3,000° C. can be reached by the intense combustion of carbon with oxygen, with limitation of the amount of circulating gas.

Somewhat more particularly the process for the production of calcium carbide is carried out in the following manner. Into the furnace shaft B there is introduced a charge consisting of lime and coke which has been previously mixed in the proper proportions and briquetted. The furnace shaft leads to the smelting or reducing zone S and this zone is in communication with the fuel filled shafts or regenerators A' and A". The charge within the smelting zone S is heated by a mixture of combustion and combustible gases which have been produced, for example, in the shaft or regenerator A'. The production of the highly heated gaseous mixture is brought about by the introduction of steam into the top of the shaft and by a combustion of a part of the fuel filling through the introduction of oxygen or air enriched in oxygen at the base of the fuel filled shaft by means of the inlet d. The highly heated gaseous mixture passes through the communicating channel to the smelting and reducing zone S wherein it contacts directly with the charged materials and heats them to a high temperature necessary for completing the reaction and for melting the carbide, after which the now waste gases pass through the channel into the fuel filled shaft A". In this shaft heat of the waste gases is stored, or, in other words, the fuel filling therein is preheated. A portion of the hot gaseous mixture, after contacting with the charge in the smelting zone, passes up through the furnace shaft B and preheats the charged material to reaction temperature. This gas is withdrawn from the top of the furnace shaft B through the connection t. After a period of time the flow of gases through the regenerators or fuel filled shafts and the smelting zone is reversed so that steam would be introduced at the top of the shaft A", react with the highly heated fuel therein forming a combustible gas which mixes with the combustion gases arising from the burning of a part of the fuel in the base of the shaft by introduction of oxygen thereinto. The mixed gases then enter the smelting zone on the opposite side to that at which they previously entered, pass in direct contact with and around the charged material and then out through shaft A' in which heat thereof is stored and the fuel preheated. The gas flow is thus alternately and periodically reversed. The molten carbide flows into a canal at the bottom of the smelting zone from which it may be withdrawn as desired.

The ash resulting from combustion of the coal or coke may be partially carried along with the heating gas stream, and partially melted whereupon it will flow into the canal and collect as a slag. This slag may be readily separated from the carbide following tapping.

This application is in part a continuation of my copending application, Serial No. 573,038, filed November 5, 1931.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises introducing steam into the body of highly heated fuel in the heat yielding zone whereby a combustible gas is produced, intermixing the thus produced gas with a combustion gas formed by a burning of a part of the solid fuel thus diluting such gas with attainment of proper smelting temperature, causing the intermixed gases to circulate through the furnace and heat storing and heat yielding zones in sequence, whereby said charge is heated, and alternately and periodically reversing the flow of the heated gases through the heat yielding and heat storing zones and around the charge in the furnace so that the zone previously functioning as the heat yielding zone becomes the heat storing zone and the previously acting heat storing zone becomes the heat yielding zone.

2. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises introducing steam into the body of highly heated fuel in the heat yielding zone whereby a combustible gas is produced, intermixing the thus produced gas with a combustion gas formed by a burning of a part of the solid fuel thus diluting such gas with attainment of proper smelting temperature, causing the intermixed gases to circulate through the furnace and heat storing and heat yielding zones in sequence whereby said charge is heated, withdrawing a part of the circulating gas as it passes from the heat storing to the heat yielding zone for use as a combustible gas, and alternately and periodically reversing the flow of the heated gases through the heat yielding and heat storing zones and around the charge in the furnace so that the zone previously functioning as the heat yielding zone becomes the heat storing zone and the previously acting heat storing zone becomes the heat yielding zone.

3. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises charging a reducible oxide belonging to the group consisting of lime and silica, mixed with coal into said furnace, introducing steam into the body of highly heated fuel in the heat yielding zone whereby a combustible gas is produced, intermixing the thus produced gas with a combustion gas formed by a burning of a part of the solid fuel thus diluting such gas with attainment of proper smelting temperature, causing the intermixed gases to circulate through the furnace and heat storing and heat yielding zones in sequence whereby said charge is heated, withdrawing a part of the circulating gas as it passes from the heat storing to the heat yielding zone for use as a combustible gas, and alternately and periodically reversing the flow of the heated gases through the heat yielding and heat storing zones and around the charge in the furnace so that the zone previously functioning as the heat yielding zone becomes the heat storing zone and the previously acting heat storing zone becomes the heat yielding zone.

4. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises charging lime in admixture with coal in an amount sufficient to effect reduction of the lime into said furnace, introducing steam into the body of highly heated fuel in the heat yielding zone whereby a combustible gas is produced, intermixing the thus produced gas with a combustion gas formed by a burning of a part of the solid fuel thus diluting such gas with attainment of proper smelting temperature, causing the intermixed gases to circulate through the furnace and heat storing and heat yielding zones in sequence whereby said charge is heated, withdrawing a part of the circulating gas as it passes from the heat storing to the heat yielding zone for use as a combustible gas, and alternately and periodically reversing the flow of the heated gases through the heat yielding and heat storing zones and around the charge in the furnace so that the zone previously functioning as the heat yielding zone becomes the heat storing zone and the previously acting heat storing zone becomes the heat yielding zone.

5. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises charging an admixture of lime and coal in quantities required for the formation of calcium carbide and in the form of briquettes into said furnace, introducing steam into the body of highly heated fuel in the heat yielding zone whereby a combustible gas is produced, intermixing the thus produced gas with a combustion gas formed by a burning of a part of the solid fuel thus diluting such gas with attainment of proper smelting temperature, causing the intermixed gases to circulate through the furnace and heat storing and heat yielding zones in sequence whereby said charge is heated, withdrawing a part of the circulating gas as it passes from the heat storing to the heat yielding zone for use as a combustible gas, and alternately and periodically reversing the flow of the heated gases through the heat yielding and heat storing zones and around the charge in the furnace so that the zone previously functioning as the heat yielding zone becomes the heat storing zone and the previously acting heat storing zone becomes the heat yielding zone.

6. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises heating of the charged material by direct contact with a combustion gas diluted by admixture with a combustible gas simultaneously formed by interaction of steam introduced into the highly heated solid fuel filling of the heat yielding zone, said fuel filling having been heated previously by direct contact with hot waste gases flowing from the heated charged material.

7. In a smelting process wherein a charge is introduced into a furnace communicating with separate solid fuel filled heat yielding and heat storing zones, said charge being heated by gases raised to smelting temperature by contact with highly heated solid fuel in the heat yielding zone and by a combustion of a part of such fuel by introduction thereinto of an oxygen containing gas, and the thus highly heated gas mixture passing around the charge undergoing treatment and being withdrawn through the body of solid fuel in the heat storing zone, the improvement which comprises charging the furnace with an admixture of lime and coal in proportions to form calcium carbide and in the form of briquettes, and heating the thus charged material by direct contact with a combustion gas diluted by admixture with a combustible gas simultaneously formed by interaction of steam introduced into the highly heated solid fuel filling of the heat yielding zone, said fuel filling having been heated previously by direct contact with hot waste gases flowing from the heated charged material.

8. A process as defined in claim 6 in which the flow of heating gases for heating the charged material is alternately and periodically reversed through heat yielding and heat storing zones so that the zone previously functioning as the heat yielding zone now acts to store heat from waste gases, and the previously functioning heat storing zone now serves as a heat yielding zone.

9. A process as defined in claim 1 in which a part of the heating gases are conducted through the charged material prior to introduction of said material into the furnace.

10. A process as defined in claim 5 in which the charge is an admixture of silica and coal in the form of briquettes.

11. A process as defined in claim 6 in which the charge is an admixture of a reducible oxide belonging to the group consisting of lime and silica, with coal.

MATHIAS FRANKL.